United States Patent
Zimmerman et al.

(10) Patent No.: US 11,480,132 B2
(45) Date of Patent: Oct. 25, 2022

(54) INTERNAL COMBUSTION ENGINE AND HEAD GASKET FOR INTERNAL COMBUSTION ENGINE

(71) Applicant: DEERE & COMPANY, Moline, IL (US)

(72) Inventors: Kaleb J. Zimmerman, Cedar Falls, IA (US); Jeremy M. Kessens, Waterloo, IA (US); Douglas S. Brocco, Waterloo, IA (US); Gregory J. Horton, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/068,694

(22) Filed: Oct. 12, 2020

(65) Prior Publication Data

US 2022/0112863 A1 Apr. 14, 2022

(51) Int. Cl.
*F02F 11/00* (2006.01)
*F02F 7/00* (2006.01)
*F02F 1/36* (2006.01)
*F01P 7/14* (2006.01)
*F16J 15/08* (2006.01)
*F01P 3/02* (2006.01)

(52) U.S. Cl.
CPC .............. *F02F 11/002* (2013.01); *F01P 3/02* (2013.01); *F01P 7/14* (2013.01); *F02F 1/36* (2013.01); *F02F 7/0021* (2013.01); *F16J 15/0818* (2013.01); *F01P 2003/028* (2013.01); *F01P 2007/143* (2013.01)

(58) Field of Classification Search
CPC .......... F02F 11/002; F02F 1/36; F02F 7/0021; F01P 3/02; F01P 7/14; F01P 2003/028; F01P 2007/143; F16J 15/0818
See application file for complete search history.

(56) References Cited

U.S. PATENT DOCUMENTS

| | | | | |
|---|---|---|---|---|
| 4,590,894 A | * | 5/1986 | Ishida | F02F 1/14 123/41.74 |
| 4,683,844 A | * | 8/1987 | Arai | F02F 11/002 123/41.82 R |
| 4,979,758 A | * | 12/1990 | Miyaoh | F16J 15/0825 277/599 |

(Continued)

FOREIGN PATENT DOCUMENTS

JP 2010209749 * 9/2010

*Primary Examiner* — Syed O Hasan

(57) ABSTRACT

An internal combustion engine and a head gasket are provided. The internal combustion engine includes a block having at least one cylinder, a head joined to the block at a head interface, a cooling fluid circulation passage extending at least partially through the head and the block and having a first portion disposed in the head and a second portion disposed in the block, a head gasket having a plate extending across the head interface and separating the first portion of the cooling fluid circulation passage from the second portion of the cooling fluid circulation passage, and a plurality of orifices extending through the plate. The plurality of orifices is aligned with the cooling fluid circulation passage and is configured to control a flow of cooling fluid circulating between the first portion of the cooling fluid circulation passage and the second portion of the cooling fluid circulation passage.

20 Claims, 3 Drawing Sheets

(56) References Cited

U.S. PATENT DOCUMENTS

| | | | |
|---|---|---|---|
| 7,137,361 B2 * | 11/2006 | Vialard | F01P 7/14 123/41.08 |
| 2016/0010533 A1 * | 1/2016 | Matsumoto | F02F 1/14 123/41.08 |

* cited by examiner

INTERNAL COMBUSTION ENGINE AND HEAD GASKET FOR INTERNAL
COMBUSTION ENGINE

BACKGROUND

Internal combustion engines may include one or more cooling fluid circulation passages to allow a cooling fluid such as a coolant to flow through a block and a head of the engine. The engine may further include a head gasket to seal the connection or otherwise provide an interface between a cylinder head of the engine and a cylinder block of the engine. The cooling fluid circulation passage may extend from the block to the head, or vice versa, through or across the head gasket to provide flow of cooling fluid to the block and head. The cooling fluid circulation passage may include one or more curves or paths to circulate the cooling fluid to various portions of the head or other portions of the engine. It is desirable to configure the cooling fluid circulation passage, the head, and/or other portions or operation of the engine to direct the cooling fluid to the high temperature areas of the engine, such as, in a non-limiting example, the cooling fluid circulation passage surfaces in the head adjacent to the cylinder(s) of the engine.

SUMMARY

Various aspects of examples of the present disclosure are set out in the claims.

In accordance with an embodiment of the present disclosure, an internal combustion engine includes a block comprising at least one cylinder, a head joined to the block at a head interface, a cooling fluid circulation passage extending at least partially through the head and the block and comprising a first portion disposed in the head and a second portion disposed in the block, a head gasket comprising a plate extending across the head interface and separating the first portion of the cooling fluid circulation passage from the second portion of the cooling fluid circulation passage, and a plurality of orifices extending through the plate, wherein the plurality of orifices is aligned with the cooling fluid circulation passage and is configured to control a flow of cooling fluid circulating between the first portion of the cooling fluid circulation passage and the second portion of the cooling fluid circulation passage.

The engine may further include a second plurality of orifices extending through the plate, and a second cooling fluid circulation passage extending at least partially through the head and the block and comprising a first portion disposed in the head and a second portion disposed in the block, wherein the second plurality of orifices is aligned with the second cooling fluid circulation passage and is configured to control a flow of cooling fluid circulating between the first portion of the second cooling fluid circulation passage and the second portion of the second cooling fluid circulation. The plurality of orifices may be aligned with the cooling fluid circulation passage such that each of the plurality of orifices is contained within the cooling fluid circulation passage at the head interface. At least one of the plurality of orifices may be tangentially aligned with the cooling fluid circulation passage. At least one of the plurality of orifices may comprise a circular shape. At least one of the plurality of orifices may comprise a rectangular shape. At least one of the plurality of orifices may comprise an oval shape. A first orifice of the plurality of orifices may be larger than a second orifice of the plurality of orifices. The first orifice and the second orifice may be aligned with the cooling fluid circulation passage such that the first orifice is positioned closer to the at least one cylinder of the block than the second orifice.

In accordance with an embodiment of the present disclosure, a head gasket for an internal combustion engine includes a head and a block joined at a head interface and a cooling fluid circulation passage extending at least partially through the head and the block. The head gasket includes a plate extending across the head interface and configured to separate a first portion of the cooling fluid circulation passage disposed in the head from a second portion of the cooling fluid circulation passage disposed in the block, a plurality of orifices extending through the plate, wherein the plurality of orifices is configured to be aligned with the cooling fluid circulation passage and control a flow of cooling fluid circulating between the first portion of the cooling fluid circulation passage and the second portion of the cooling fluid circulation passage.

The head gasket may further include a second plurality of orifices extending through the plate, wherein the second plurality of orifices is configured to be aligned with a second cooling fluid circulation passage and control a flow of cooling fluid circulating between a first portion of the second cooling fluid circulation passage and a second portion of the second cooling fluid circulation.

The plurality of orifices may be configured to be aligned with the cooling fluid circulation passage such that each of the plurality of orifices is contained within the cooling fluid circulation passage at the head interface. At least one of the plurality of orifices may be configured to be tangentially aligned with the cooling fluid circulation passage. At least one of the plurality of orifices may have a circular shape. At least one of the plurality of orifices may have a rectangular shape. At least one of the plurality of orifices may have an oval shape. A first orifice of the plurality of orifices may have a greater size than a second orifice of the plurality of orifices. The first orifice and the second orifice may be configured to be aligned with the cooling fluid circulation passage such that the first orifice is positioned closer to a cylinder of the block than the second orifice.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
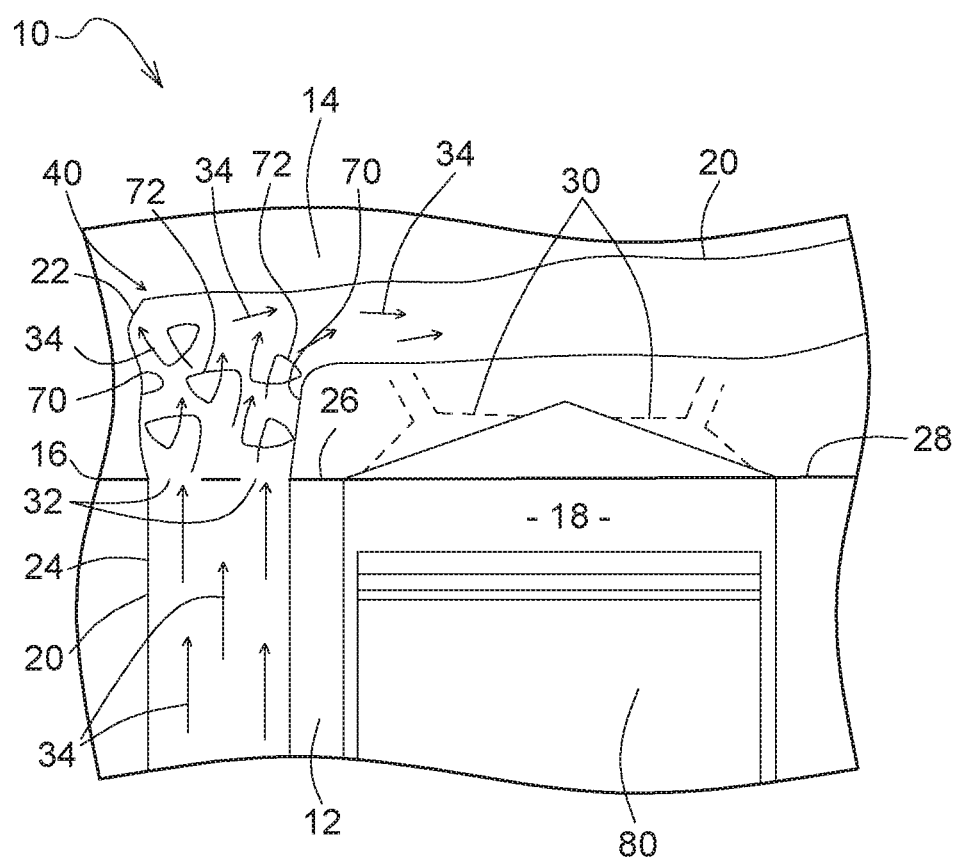
FIG. 1 is an enlarged cross-sectional view of internal combustion engine in accordance with an embodiment of the present disclosure.
Figure 2:
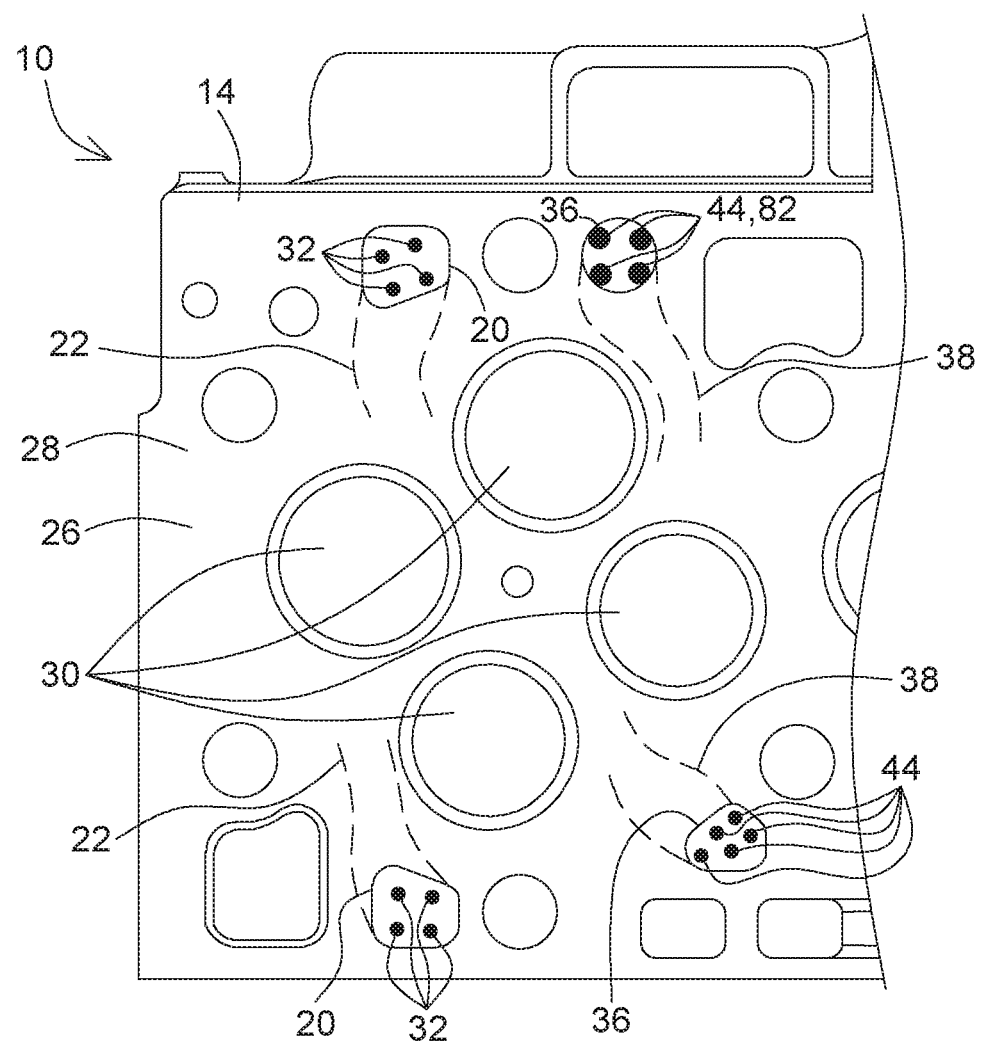
FIG. 2 is a partial bottom plan view of a head gasket and a head of an engine in accordance with an embodiment of the present disclosure.
Figure 3:
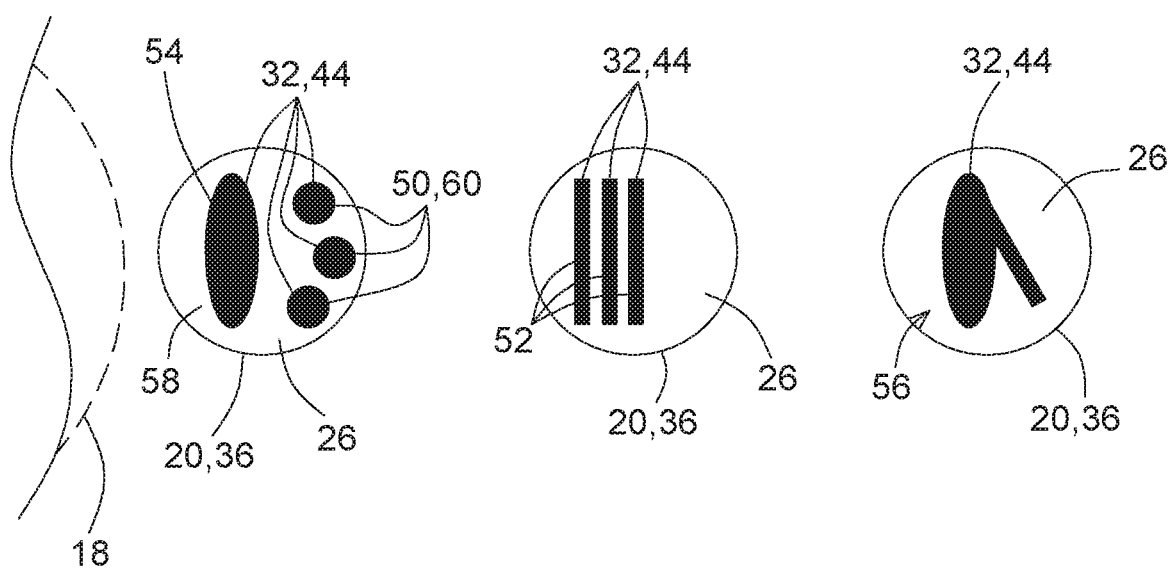
FIG. 3 illustrates orifices of one or more head gasket(s) and/or engine(s) in accordance with an embodiment of the present disclosure.

At least one embodiment of the subject matter of this disclosure is understood by referring to FIGS. 1 through 3 of the drawings.

Referring now to FIG. 1, an enlarged cross-sectional view of an internal combustion engine 10 is shown in accordance with an embodiment of the present disclosure. The engine 10 includes a block 12 and a head 14 joined to the block 12 at a head interface 16 by one or more fasteners (not shown). The block 12 further includes one or more cylinder(s) 18 having one or more piston(s) 80 and one or more intake and/or exhaust valves 30.

The engine 10 further includes a cooling fluid circulation passage 20 extending at least partially through the head 14 and the block 12 and configured to direct cooling fluid 34 through the block 12, the head 14, and/or another part of the engine 10. The cooling fluid circulation passage 20 includes a first portion 22 disposed in the head 14 and a second portion 24 disposed in the block 12. In the embodiment illustrated in FIG. 1, the second portion 24 extends substantially parallel to the cylinder(s) 18, and the first portion 22 of the passage 20 includes at least one curve 40 whereby the cooling fluid 34 initially flows parallel with the second portion 24 before flowing through the curve 40 and flowing at least partially across the head 14. In additional embodiments not shown, the flow of the cooling fluid 34 is reversed such that the cooling fluid 34 flows from the head 14 to the block 12. Further, in additional embodiments, the cooling fluid 34 is another heat exchanging fluid, such as a fluid that heats one or both of the block 12 and/or the head 14.

The engine 10 further includes a head gasket 26 having a plate 28. The plate 28 forms the main portion of the head gasket 26 and extends across the head interface 16. The plate 28 of the head gasket 26 separates the first portion 22 of the cooling fluid circulation passage 20 from the second portion 24 of the cooling fluid circulation passage 20. In an embodiment, the plate 28 is composed of metal, such as a stainless steel in a non-limiting example, but the plate 28 and/or any other portion of the head gasket 26 may include one or more other materials, such as a ceramic, polymer, elastomer, composite, and/or any combination thereof in additional non-limiting examples.

As shown in FIG. 1 and in further detail in FIG. 2, the engine 10 and/or the head gasket 26 further includes a plurality of orifices 32 extending through the plate 28. The orifices 32 are aligned with the cooling fluid circulation passage 20. In the illustrated embodiment, multiple orifices 32 are located within a single cooling fluid circulation passage 20 to form an array or grouping of orifices 32. In an embodiment, the orifices 32 are vertically and/or axially aligned with the cooling fluid circulation passage 20 such that the cooling fluid 34 flows through the orifices 32 while flowing through the cooling fluid circulation passage 20.

In an additional embodiment, as illustrated in FIG. 2, a second plurality of orifices 44 extends through the plate 28. In the additional embodiment, a second cooling fluid circulation passage 36 extends at least partially through the head 14 and the block 12. The second cooling fluid circulation passage 36 includes a first portion 38 disposed in the head 14 and a second portion (not shown) disposed in the block 12. Although not illustrated, the second portion of the second cooling fluid circulation passage 36 may be illustrated identically as the second portion 24 of the cooling fluid circulation passage 20 in one embodiment. The second plurality of orifices 44 is aligned, such as vertically and/or axially aligned in particular embodiments, with the second cooling fluid circulation passage 36. The second plurality of orifices 44 controls or is configured to control a flow of cooling fluid 34 circulating between the first portion 38 of the second cooling fluid circulation passage 36 and the second portion of the second cooling fluid circulation 36. It will be appreciated that any number of pluralities of orifices or cooling fluid circulation passages are provided in the engine 10 and/or the head gasket 26 of additional embodiments of the present disclosure. Any feature or embodiment of the orifices 32 or cooling fluid circulation passage 20 may be applied to the orifices 44 or the second cooling fluid circulation passage 36 and vice versa.

The orifices 32, 44 control or are configured to control a flow of cooling fluid 34, such as, with regard to orifices 32, circulating between the first portion 22 of the cooling fluid circulation passage 20 and the second portion 24 of the cooling fluid circulation passage 20. In one or more embodiments, the number, size, arrangement, or other feature of the orifices 32, 44 are configured to meter the cooling fluid 34 and/or restrict flow of the cooling fluid 34 to modulate pressure and/or flow of the cooling fluid 34 at the head 14, the block 12, and other portions of the engine 10.

In an embodiment, as further shown in FIG. 2, one or more of the pluralities of orifices 32, 44 is aligned with the cooling fluid circulation passage 20 and/or the second cooling fluid circulation passage 36 such that each of the plurality of orifices 32, 44 is contained within the cooling fluid circulation passage 20 or the second cooling fluid circulation passage 36 at the head interface 16. In an embodiment, one or more of the orifices 32, 44 of the pluralities of orifices 32, 44, such as the orifices 82 relative to passage 36 illustrated in FIG. 2, is tangentially aligned with the cooling fluid circulation passage 20 and/or the second cooling fluid circulation passage 36, or the edge of the one or more orifices 32, 44 is directly aligned with the cooling fluid circulation passage 20 and/or the second cooling fluid circulation passage 36.

Referring now to FIG. 3 with continued reference to FIGS. 1 and 2, various embodiments of the present disclosure include one or more orifices 32, 44 having one or more shapes and/or sizes. In an embodiment, one or more of the orifices 32, 44 includes a circular shape 50. In an embodiment, one or more of the orifices 32, 44 includes a slot, square, or otherwise rectangular shape 52. In an embodiment, one or more of the orifices 32, 44 includes an oval shape 54. In additional embodiments, one or more orifices includes a combination of shapes, such as the combination 56 illustrated in FIG. 3, and/or any other shape or combination of shapes at any location and/or in any configuration in the orifice(s) 32, 44.

As illustrated in FIG. 3, a first orifice 58 of one or more of the pluralities of orifices 32, 44 is larger than a second orifice 60 of the plurality of orifices 32, 44. The first orifice 58 and the second orifice 60 are aligned with the cooling fluid circulation passage 20 and/or the second fluid circulation passage 36 such that the first orifice 58 is positioned closer to the cylinder 18 of the block 12 than the second orifice 60. Such sizing and positioning is provided in one or more embodiments to enhance heat transfer at one or more surfaces of the cooling fluid circulation passage 20 and/or the second fluid circulation passage 36 adjacent to or closer to combustion heat in the cylinder 18.

Without in any way limiting the scope, interpretation, or application of the claims appearing below, it will be appreciated that the engine 10 and/or the head gasket 26 of various embodiments described herein utilize orifices 32, 44 located, arranged, sized, and/or otherwise configured to control cooling fluid impingement or flow to enhance heat transfer in the engine 10. As shown in FIG. 1, the orifices 32, 44 induce turbulent flow 72 of the cooling fluid 34 such that the cooling fluid 34 impinges on side surfaces 70 of the cooling fluid circulation passage 20 and/or the second fluid circulation passage 36 and, thereby, enhance heat transfer in the head 14 at a location adjacent to or closer to combustion heat in the cylinder 18. Further, the orifices 32, 44 are aligned with or located tangentially with or adjacent to the side surfaces 70 of the cooling fluid circulation passage 20 and/or the second fluid circulation passage 36 such that the cooling fluid 34 provides cooling at a location lower and, thereby, closer to combustion heat of the cylinder 18.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An internal combustion engine comprising: a block comprising at least one cylinder; a head joined to the block at a head interface; a cooling fluid circulation passage extending at least partially through the head and the block and comprising a first portion disposed in the head and a second portion disposed in the block such that the cooling fluid circulation passage defines a single flow path through the first portion and through the second portion; a head gasket comprising a plate extending across the head interface and separating the first portion of the cooling fluid circulation passage from the second portion of the cooling fluid circulation passage; and a plurality of orifices extending through the plate to allow a flow of cooling fluid to circulate therethrough, wherein all of the plurality of orifices are aligned with the cooling fluid circulation passage such that all of the plurality of orifices are located within the single cooling fluid circulation passage to form an array of orifices, and all cooling fluid flowing from the second portion of the cooling fluid circulation passage flows through all of the plurality of orifices before flowing through the first portion of the cooling fluid circulation passage that defines the single flow path extending through the first portion and the second portion, wherein all of the plurality of orifices are configured to control a flow of cooling fluid circulating between the second portion of the cooling fluid circulation passage and the first portion of the cooling fluid circulation passage.

2. The engine of claim 1, further comprising:
    a second plurality of orifices extending through the plate; and
    a second cooling fluid circulation passage extending at least partially through the head and the block and comprising a first portion disposed in the head and a second portion disposed in the block, wherein the second plurality of orifices is aligned with the second cooling fluid circulation passage and is configured to control a flow of cooling fluid circulating between the first portion of the second cooling fluid circulation passage and the second portion of the second cooling fluid circulation.

3. The engine of claim 1, wherein the plurality of orifices is aligned with the cooling fluid circulation passage such that each of the plurality of orifices is contained within the cooling fluid circulation passage at the head interface.

4. The engine of claim 1, wherein at least one of the plurality of orifices is tangentially aligned with the cooling fluid circulation passage.

5. The engine of claim 1, wherein at least one of the plurality of orifices comprises a circular shape.

6. The engine of claim 1, wherein at least one of the plurality of orifices comprises a rectangular shape.

7. The engine of claim 1, wherein at least one of the plurality of orifices comprises an oval shape.

8. The engine of claim 1, wherein a first orifice of the plurality of orifices is larger than a second orifice of the plurality of orifices.

9. The engine of claim 8, wherein the first orifice and the second orifice are aligned with the cooling fluid circulation passage such that the first orifice is positioned closer to the at least one cylinder of the block than the second orifice.

10. A head gasket for an internal combustion engine having a head and a block joined at a head interface and a cooling fluid circulation passage extending at least partially through the head and the block, the head gasket comprising: a plate extending across the head interface and configured to separate a first portion of the cooling fluid circulation passage disposed in the head from a second portion of the cooling fluid circulation passage disposed in the block such that the cooling fluid circulation passage defines a single flow path through the first portion and through the second portion; and a plurality of orifices extending through the plate to allow a flow of cooling fluid to circulate therethrough, wherein all of the plurality of orifices are configured to be aligned with the cooling fluid circulation passage such that all of the plurality of orifices are located within the single cooling fluid circulation passage to form an array of orifices, and all cooling fluid flowing from the second portion of the cooling fluid circulation passage flows through all of the plurality of orifices before flowing through the first portion of the cooling fluid circulation passage that defines the single flow path extending through the first portion and the second portion, orifices and wherein all of the plurality of orifices control a flow of cooling fluid circulating between the second portion of the cooling fluid circulation passage and the first portion of the cooling fluid circulation passage.

11. The head gasket of claim 10, further comprising:
    a second plurality of orifices extending through the plate, wherein the second plurality of orifices is configured to be aligned with a second cooling fluid circulation passage and control a flow of cooling fluid circulating between a first portion of the second cooling fluid circulation passage and a second portion of the second cooling fluid circulation.

12. The head gasket of claim 10, wherein the plurality of orifices is configured to be aligned with the cooling fluid circulation passage such that each of the plurality of orifices is contained within the cooling fluid circulation passage at the head interface.

13. The head gasket of claim 10, wherein at least one of the plurality of orifices is configured to be tangentially aligned with the cooling fluid circulation passage.

14. The head gasket of claim 10, wherein at least one of the plurality of orifices comprises a circular shape.

15. The head gasket of claim 10, wherein at least one of the plurality of orifices comprises a rectangular shape.

16. The head gasket of claim 10, wherein at least one of the plurality of orifices comprises an oval shape.

17. The head gasket of claim 10, wherein a first orifice of the plurality of orifices has a greater size than a second orifice of the plurality of orifices.

18. The head gasket of claim 17, wherein the first orifice and the second orifice are configured to be aligned with the cooling fluid circulation passage such that the first orifice is positioned closer to a cylinder of the block than the second orifice.

19. The internal combustion engine of claim 1, wherein each of the plurality of orifices is located completely within the cooling fluid circulation passage such that all of the plurality of orifices are axially aligned with the cooling fluid circulation passage.

20. The head gasket of claim 10, wherein each of the plurality of orifices is located completely within the cooling fluid circulation passage such that all of the plurality of orifices are axially aligned with the cooling fluid circulation passage.

* * * * *